United States Patent

Schmidt

[11] 4,057,872
[45] Nov. 15, 1977

[54] ROLLER MOUNT

[75] Inventor: Bradley J. Schmidt, East Dundee, Ill.

[73] Assignee: Illinois Tool Works Inc., Chicago, Ill.

[21] Appl. No.: 658,642

[22] Filed: Feb. 17, 1976

[51] Int. Cl.² .............................................. B60B 33/00
[52] U.S. Cl. ........................................ 16/29; 211/151; 308/3.8; 312/311
[58] Field of Search ............... 16/29; 211/41, 74, 151, 211/162; 308/3.8; 312/349, 350, 311

[56] References Cited
U.S. PATENT DOCUMENTS 3,261,647  7/1966  Stewart .................................. 308/3.8
3,744,646  7/1973  Duncan et al. ...................... 211/41 X

*Primary Examiner*—Werner H. Schroeder
*Assistant Examiner*—Conrad L. Berman
*Attorney, Agent, or Firm*—Olson, Trexler, Wolters, Bushnell & Fosse, Ltd.

[57] ABSTRACT

A support mount is disclosed for journalling a roller or the like upon a wire basket or similar structure such as that offered in dishwashers and like appliances. The wire basket includes a bi-legged eyelet to which the mount is secured. The mount comprises an axle for rotatably carrying the roller and an axle extension. A backing plate formed at an end of the axle extension supports a plurality of arms adapted to embracibly engage the wire basket eyelet. A radially elongated backup skirt inhibits mount tipping.

16 Claims, 4 Drawing Figures

U.S. Patent   Nov. 15, 1977   4,057,872
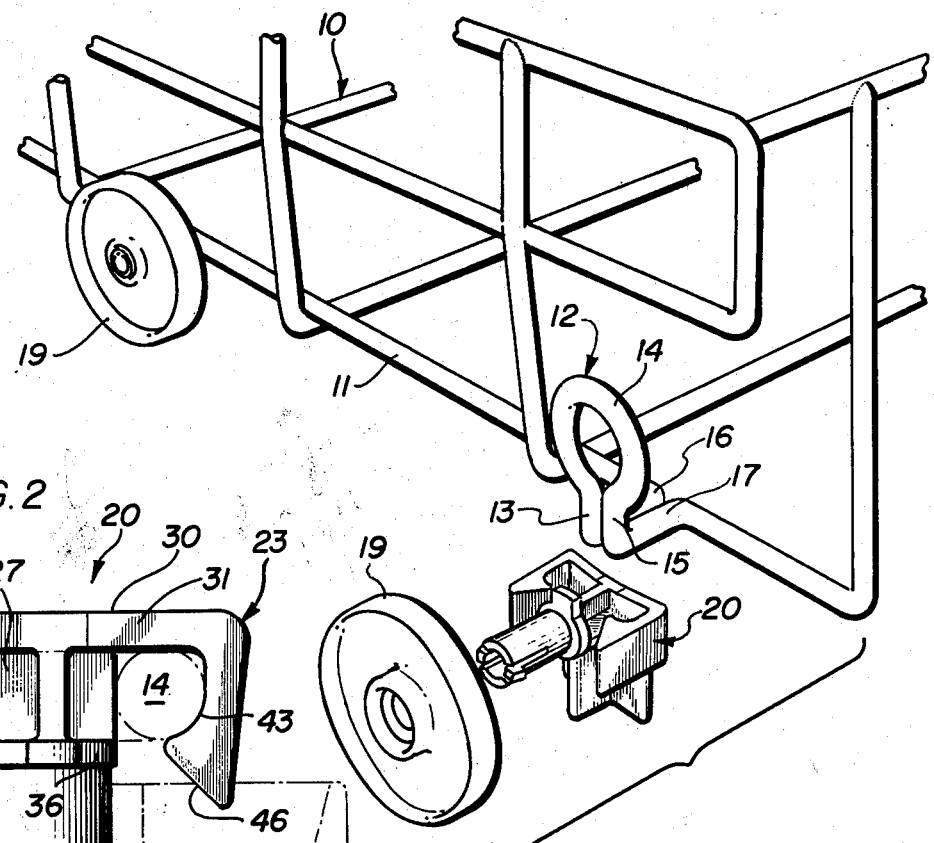
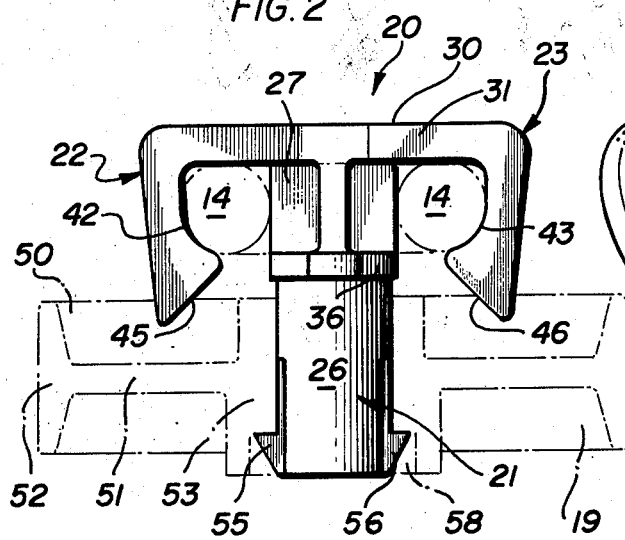
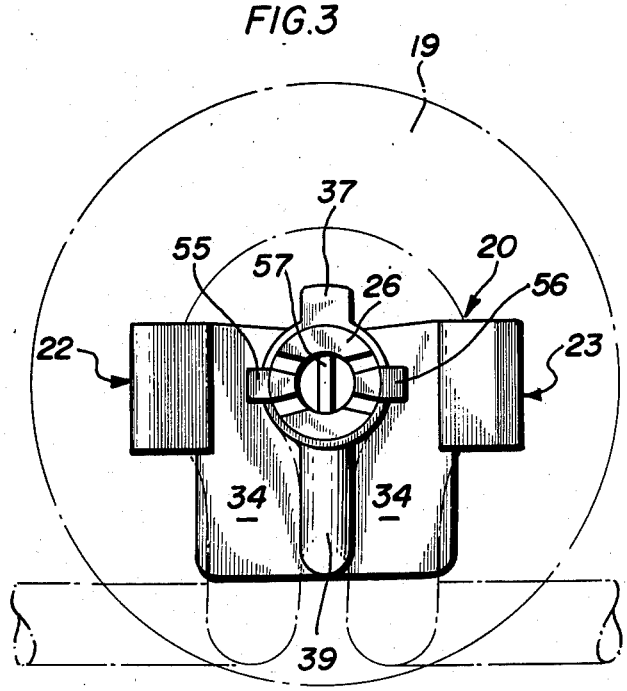
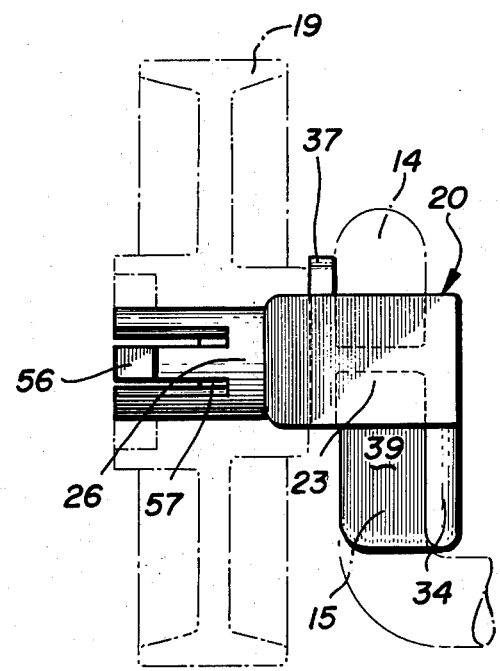

ROLLER MOUNT

BACKGROUND OF THE INVENTION

This invention relates generally to a mount or support for a roller which is especially adapted for use with wire baskets such as those offered in dishwashers and like appliances.

In modern appliances such as dishwashers, wire baskets or similar structures are provided for holding glassware and the like. To permit these baskets to be moved from an outer loading position to an inner dishwasher use position, rollers are commonly attached to the baskets and are positioned for traveling action upon a roller guide or like structure. It is important that mounts which journal these rollers upon the basket be inexpensive, yet provide a free operational action to the roller. The manufacturer's reputation depends, to some degree, on providing a mount which can be confidently expected to provide a long service life.

Accordingly, it is an object of the present invention to provide a low cost, effective mount for journalling a roller or the like upon a wire basket or similar structure.

A more specific object is to provide a mount which can be easily and inexpensively formed of a plastic material, yet which can be confidently expected to provide a long and trouble-free service life.

A related object is to provide such a device formed in but a single piece. Another related object is to provide such a device which affords a relatively smooth surface without protuberances to catch upon other objects or retain excessive food or water.

Another is to provide such a device which can be quickly and correctly attached to the basket or other mounting structure by even inexperienced personnel. A related object is to provide such a device which, when attached, is naturally attached in a secure manner providing strong support to the roller and the basket.

Yet another object is to provide such a device which will not move or become dislodged even after repeated, prolonged, severe usage. A related object is to provide a device of the type described which affirmatively discourages tipping, rotational, axial and translational motion.

Still another object is to provide such a device which, although formed of inexpensive material, will withstand the rigors imposed by high temperatures, turbulent water, heavy loads, and other factors associated with relatively severe operating conditions.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing a typical wire basket or similar mounting structure having mounted thereto a roller by means of the present invention and, in exploded relation, the wire basket, another roller, and the novel mount;

FIG. 2 is a top plan view of the novel mount;

FIG. 3 is a front elevational view of the novel mount; and

FIG. 4 is a side elevational view of the novel mount.

DETAILED DESCRIPTION

While the invention will be described in connection with a preferred embodiment, it will be understood that it is not intended to limit the invention to this embodiment. Specifically, it will be understood that it is intended that this invention can be used in connection with any other structure which, by its nature, requires a roller or similar object to be carried, and which is adapted to accept the mount of the present invention. Indeed, it is intended to cover all alternatives, modifications and equivalents as may be included within the spirit and scope of the invention as defined by the appended claims.

Turning first to FIG. 1, there is shown a wire basket 10. Such wire baskets and like structures are typically used in dishwashers and similar appliances to store and position glassware or other items for washing. In the illustrated embodiment, this basket 10 is defined and formed of relatively stiff wire 11 formed of a wire core and a resilient, rubber-like covering. A portion of this wire 11 is shaped to form an eyelet structure 12 which includes a first leg 13, a loop 14 extending from the leg, and a second leg 15 extending from the loop 14 in a direction which is substantially parallel to and adjacent the first leg 13. Leg extensions 16 and 17 can be included to offset the eyelet 12 from remaining portions of the basket. It is to this eyelet 12 that the roller 19 is mounted by the novel mount 20 embodying the present invention.

In general, this mount 20 can be considered to comprise an axle 21 and a plurality of arms 22 and 23 for embracing the wire eyelet 14 at a corresponding number of locations. To provide a center of rotation for the roller 19, the axle 21 includes a shaft 26; and to provide an engagement structure for the loop 14, the axle 21 includes an extension 27.

Mount motion or play in an axial direction is prohibited, in accordance with the invention, by a backing plate 30 at a free end 31 of this axle extension 27. This backing plate 30 is adapted, as can be envisioned, to abuttively engage the loop portion 14 of the eyelet 12.

To inhibit mount tipping motion (in a clockwise direction as viewed in FIG. 4), in further accordance with the invention, the backing plate 30 includes a radially elongated backup skirt 34. In addition, the axle shaft 26 and extension 27 are separated by a collar 36 which is provided with a radially extending flange 37 projecting in a direction opposite the backup plate skirt 34. This flange 37 is adapted to engage the opposite side of the eyelet 14 from the backup skirt 34.

Mount rotational motion is inhibited, in yet further accordance with the invention, by a radially elongated shoulder 39 which extends from the extension 27 and from the backing plate 30 for location between the eyelet legs 13 and 15.

Mount motion is also discouraged by the arms 22 and 23 which include recesses 42 and 43, respectively. These recesses are so shaped and formed as to embracingly engage the eyelet 14 and capture that eyelet 14 between the arms 22 and 23 and the axle extension 27. The diametrically oppositely disposed arms 22 and 23 extend generally perpendicularly to the directions of extension of the collar flange 36 and skirt 34, and shoulder 39, and parallel to the mount axle 21 for mounting efficiency.

It is a feature of the invention that the mount 20 can be easily attached to the basket 10. To this end, beveled arm tips 45 and 46 are adapted to spread the respective arms 22 and 23 as the mount 20 is pushed over, into and upon the eyelet 12. When fully mounted, it will be noted that the arm tips 45 and 46 project partially into an annular recess 50 formed by the roller web 51, an axially extended roller periphery 52, and the axially extended roller hub 53, and are thereby prevented from catching on nearby objects and from being accidentally dislodged.

It is a feature of the invention that after the mount has been secured to the basket, the roller 19 can be quickly and easily yet securely attached to the mount by simply forcing the roller in an axial direction over the shaft 26. As this axial attachment motion occurs, roller retainer tangs 55 and 56 flex radially inwardly, as can be envisioned from FIG. 3. When the roller 19 has been urged into the axial position illustrated in FIGS. 2 and 4, the tangs 55 and 56 snap back into place so as to retain the roller 19 on the shaft 26. These tangs 55 and 56 nest within an annular recess 58 formed within the roller hub 53 to minimize the possibility of the mount or any portion thereof catching upon objects in proximity with mount or roller. A web 57 can be included within the shaft 26 to provide added support to the shaft 26 itself and to the roller 19.

The invention is claimed as follows:

1. A mount adapted for complimentarily journalling a hubbed roller or a wire basket or the like having a wire eyelet including a first leg, a substantially closed loop extending from the leg and a second leg extending from the loop substantially parallel to and adjacent the first leg, the mount comprising an axle having a free-ended shaft adapted to rotatably carry the roller and a free-ended extension for location within the eyelet loop, a plurality of arms extending from the axle extension free end for embracing the eyelet wire at a corresponding plurality of locations, and means on the axle extension for radially locating the axle in and on the eyelet, said means for radially locating said axle include shoulder means radially extending from the axle extension for engagement with the loop, collar means axially separating said shaft and said extension and located to engage a portion of the loop for spacing the collar from the eyelet, and a collar flange extending from said collar in a first direction to bear against the loop and against the collar so as to cooperate in preventing mount tipping.

2. A mount according to claim 1 including an elongated shoulder radially extending from said axle extension in a second direction opposite to said first direction for location between said eyelet legs to prevent motion of said mount.

3. A mount according to claim 1 including an elongated shoulder radially extending from said axial extension for location between said eyelet legs to prevent motion of the mount on the basket.

4. A mount according to claim 1 including a backing plate extending radially of said axle extension and carrying said arms for axially locating said mount on and in said eyelet.

5. A mount according to claim 4 wherein said backing plate includes a radially extending skirt portion located to engage said eyelet legs and prevent mount tipping.

6. A mount according to claim 1 including roller retainer means at said free shaft end.

7. A mount according to claim 6 including resilient tang means being flexible radially inwardly of said shaft to permit the roller hub to be slipped thereover, the tang means snapping back into place as the hub passes over the tang means so as to retain the roller on the shaft.

8. A mount according to claim 4 wherein said tang means are provided with tips adapted to rest within a roller hub recess.

9. A mount according to claim 1 wherein there are two said arms which are disposed diametrically oppositely of one another about said axle, and extend in a direction substantially parallel to said axle.

10. A mount according to claim 9 including recesses formed in said arms, the recesses adapted to mate with the eyelet so as to retain the mount on the basket.

11. A mount according to claim 10 wherein said arms include bevelled tips adapted to flex the arms to be snapped over the eyelet as the mount is urged into its roller-carrying position in and on the eyelet.

12. A mount according to claim 11 in combination with a roller including a hub carrying a thin wheel-like web and an outer load bearing rim having a greater axial dimension than said web to form an annular recess between said hub and said rim and with said bevelled tips being dimensioned and formed to be accommodated with said roller web recess.

13. A mount adapted for journalling a complimentary roller on a wire basket or the like having a wire eyelet mount support, the wire eyelet including a first leg, a loop extending from the leg and a second leg extending from the loop substantially adjacent the first leg, the mount comprising an axle having a free-ended shaft for rotatably carrying the roller and a free-ended axle extension for location within the eyelet, a collar separating the shaft and the extension and spacing the roller from the eyelet, a collar flange extending from the collar in a first direction to bear against the loop, a backing plate at the axle extension free end, a plurality of arms extending in an axial direction from the backing plate and attached to embracibly engage the eyelet, and a radially elongated backup skirt extending opposite the first direction of collar flange extension for cooperation with the flange extension to prevent mount tipping.

14. A mount according to claim 13 including a radially elongated shoulder extending from said axle extension and said backing plate for location between the eyelet legs to prevent mount rotational motion.

15. A mount according to claim 13 including a pair of diametrically opposite arms including recesses formed in the arms and adapted to embracibly engage the eyelet and capture the eyelet between the arms and the axle extension to inhibit axial, rotational, and tipping mount motion.

16. A mount according to claim 15 wherein said arms are oriented to extend generally perpendicularly to said first direction of collar flange extension.

* * * * *